(12) United States Patent
Sakai et al.

(10) Patent No.: US 9,778,461 B2
(45) Date of Patent: Oct. 3, 2017

(54) HEAD-UP DISPLAY DEVICE

(71) Applicant: DENSO CORPORATION, Kariya, Aichi-pref. (JP)

(72) Inventors: Makoto Sakai, Kitanagoya (JP); Hiroshi Ando, Nagoya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 14/699,503

(22) Filed: Apr. 29, 2015

(65) Prior Publication Data

US 2015/0323793 A1 Nov. 12, 2015

(30) Foreign Application Priority Data

May 12, 2014 (JP) .................................. 2014-98881

(51) Int. Cl.
*G02B 27/01* (2006.01)
*G02B 26/08* (2006.01)
*G02B 27/00* (2006.01)

(52) U.S. Cl.
CPC ..... *G02B 27/0149* (2013.01); *G02B 26/0816* (2013.01); *G02B 27/0018* (2013.01); *G02B 2027/0156* (2013.01); *G02B 2027/0163* (2013.01)

(58) Field of Classification Search
None
See application file for complete search history.

(56) References Cited

U.S. PATENT DOCUMENTS

2013/0182302 A1\* 7/2013 Shikii .................... B60K 35/00
359/13

FOREIGN PATENT DOCUMENTS

| JP | 04-090934 A | 3/1992 |
| JP | 06-144083 A | 5/1994 |
| JP | 2013-224068 A | 10/2013 |
| JP | 2013-228442 A | 11/2013 |

\* cited by examiner

*Primary Examiner* — Jennifer L. Doak
(74) *Attorney, Agent, or Firm* — Posz Law Group, PLC

(57) ABSTRACT

A head-up display device is for projecting display light onto a projection member. The head-up display device includes a display, a reflecting member, an outside light prevention portion, and a state controller. The display emits the display light. The reflecting member reflects the display light emitted from the display in a reflection direction to project the display light onto the projection member. The outside light prevention portion changes between an entering state in which outside light is able to enter the display and a preventing state in which outside light is prevented from entering the display. The state controller controls the outside light prevention portion to be (i) in the entering state when the display light is projected onto the projection member and (ii) in the preventing state when the display light is not projected onto the projection member.

7 Claims, 3 Drawing Sheets

HEAD-UP DISPLAY DEVICE

CROSS REFERENCE TO RELATED APPLICATION

This application is based on and incorporates herein by reference Japanese Patent Application No. 2014-98881 filed on May 12, 2014.

TECHNICAL FIELD

The present disclosure relates to a head-up display device for projecting display light onto a projection member.

BACKGROUND

A head-up display device using a projection technology to project display light from a display has been conventionally known. To protect the display from outside light such as sunlight, such a device may have a function to prohibit the outside light from entering (reaching) the display when intense outside light is detected during its use (for example, refer to a patent literature JP 2013-224068 A).

However, according to the study by the inventors of the present disclosure, the patent literature has no mention as to operation of the prevention mechanism when the head-up display device is stopped. Thus, when the head-up display is not operating, the display may expose to outside light such as sunlight for a long time, which may result in deteriorating the display.

SUMMARY

It is an objective of the present disclosure to provide a head-up display that is capable of suppressing a display to be damaged by outside light.

In an aspect of the present disclosure, a head-up display device is for projecting display light onto a projection member. The head-up display device includes a display, a reflecting member, an outside light prevention portion, and a state controller. The display emits the display light. The reflecting member reflects the display light emitted from the display to project the display light onto the projection member. The outside light prevention portion changes between an entering state in which outside light is able to enter the display and a preventing state in which outside light is prevented from entering the display. The state controller controls the outside light prevention portion to be (i) in the entering state when the display light is projected onto the projection member and (ii) in the preventing state when the display light is not projected onto the projection member.

According to the aspect of the present disclosure, the outside light prevention portion is changed to the preventing state when the display light is not projected onto the projection member. Thus, the display can be protected from the outside light.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
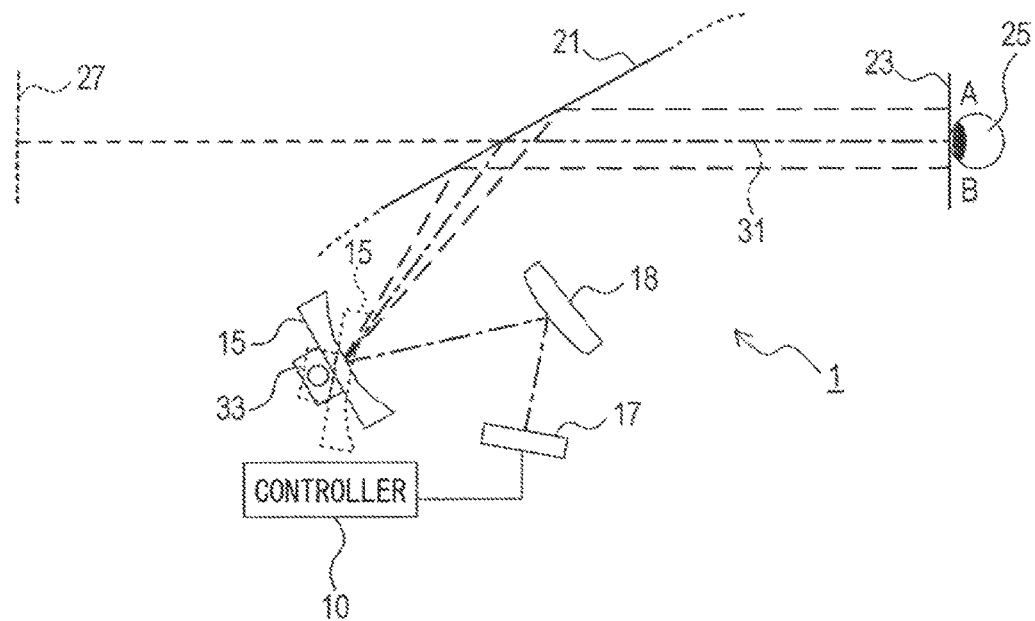
FIG. 1 is a diagram schematically illustrating an entire configuration of a head-up display device.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A head-up display device 1 according to the first embodiment is mounted to a vehicle (moving body). As shown in FIG. 1, the head-up display device 1 includes a controller 10, a display 17, a reflecting mirror 18, a concave mirror 15, and a driver 33. It should be noted that an optical axis 31 illustrated in FIG. 1 schematically indicates a center of a light path of display light displayed on the display 17.

The display 17, which is, for example, a liquid crystal display, displays (emits) an image based on a command output from the controller 10. The image (i.e., display light) on the display 17 is reflected and magnified by the reflecting mirror 18 and the concave mirror 15, and then is projected onto a windshield 21 of the vehicle, which serves as a combiner. As a result, the image reaches an eye point 25 (i.e., eyes) of a driver or an occupant whose eyes are positioned within an eye box 23. The driver can recognize an image from the display 17 as a virtual image (virtual displayed image) 27 at a point ahead of the windshield 21.

The eye box 23 is a three-dimensional area in which the driver can recognize the virtual image 27 when the driver's eyes are positioned within the eye box 23. The position of the eye box 23 is adjusted based on an image displayed by the display 17 (more specifically, a displayed region of the image on a display screen of the display 17) or an angle of the concave mirror 15. The angle of the concave mirror 15 is changed by operation of the driver 33. In other words, a reflection direction of the display light by the concave mirror 15 can be changed by changing the angle of the concave mirror 15. The angle of the concave mirror 15 may be a value associated with the reflection direction of the display light by the concave mirror 15. The driver 33 includes a motor, such as a stepping motor, and gears rotated by the motor.

When the angle of the concave mirror 15 is changed from a state indicated by a solid line in FIG. 1 to a state in which the concave mirror 15 is slightly declined, the optical line 31 (the eye box 23) moves upward to a position A shown in FIG. 1. On the contrary, when the angle of the concave mirror 15 is changed from the state indicated by the solid line in FIG. 1 to a state in which the concave mirror 15 is slightly inclined, the optical line 31 (the eye box 23) moves downward to a position B shown in FIG. 1.

With the configuration as described above, the position of the eye box 23 can be changed according to the position of a sight line of the driver (i.e., the driver's sitting height). Hereinafter, the angle of the concave mirror 15 at which the concave mirror 15 can provide for an image, which is emitted from the display 17, to the driver is referred to as an "image displaying position" of the concave mirror 15. Further, a state of the driver 33 in which the driver 33 sets the concave mirror 15 to be at the image displaying position may be referred to as an "entering state". When the driver 33 is in the entering state, outside light such as sunlight is able to enter the display 17 through the concave mirror 15 at the image displaying position.

As indicated by a dashed line in FIG. 1, the angel of the concave mirror 15 can be changed to a state in which the concave mirror 15 is further declined. In the state, although an image from the display 17 is not provided to the driver, the display 17 is suppressed to be exposed to outside light such as sunlight through the concave mirror 15. As a result, negative effects on the display 17, such as damage to the display 17 by the outside light, can be suppressed. Hereinafter, the angle of the concave mirror 15 indicated by the dashed line in FIG. 1 is referred to as a "sunlight preventing position". Further, a state of the driver 33 in which the driver 33 sets the concave mirror 15 to be at the sunlight preventing position may be referred to as a "preventing state". When the driver 33 is in the preventing state, the outside light is prevented from entering the display 17 through the concave mirror 15 at the sunlight preventing position.

Figure 2:
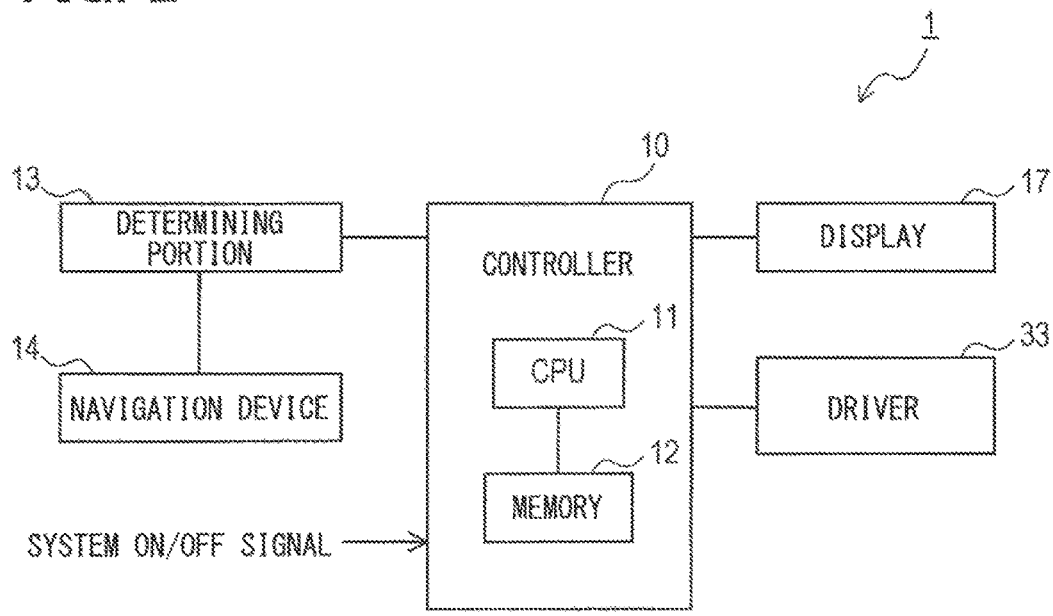
FIG. 2 is a block diagram schematically illustrating the head-up display device.

FIG. 2 illustrates a block diagram of the head-up display device 1. The head-up display device 1 includes an outside light determining portion 13 and a navigation device 14 in addition to the controller 10, the display 17 and the driver 33, as described above.

The navigation device 14 has a function to detect information associated with strong light that may damage the display 17 in addition to a conventional navigating function. The information associated with the strong light includes a traveling direction of the vehicle, positional information of sun, weather information at a present location, or the like. The navigation device 14 outputs the detected information to the outside light determining portion 13.

The outside light determining portion 13 may be a controlling circuit. The outside light determining portion 13 receives the information associated with the strong light from the navigation device 14 and determines whether the strong light enters the display 17 (the concave mirror 15) of the head-up display device 1. The outside light determining portion 13 determines that the strong light enters the display when certain conditions are satisfied. The conditions may include, for example, "fine weather", "correspondence of the traveling direction of the vehicle (i.e., a facing direction of the windshield 21) with a direction of sunlight", "the solar elevation angle greater than a specified angle" or the like. The outside light determining portion 13 outputs the determination result to the controller 10.

The controller 10 includes a computer having a CPU 11 and a memory 12 such as a ROM, a RAM or the like. The controller 10 controls the display 17 to emit an image by executing various processes as described later and changes an angle of the concave mirror 15 by controlling the operation of the driver 33. In other words, the controller 10 controls the driver 33 to change between the entering state in which outside light is able to enter the display 17 and the preventing state in which outside light is prevented from entering the display 17. The controller 10 receives a system ON signal for turning on the head-up display device 1 and a system OFF signal (system ON/OFF signal) for turning off the head-up display device 1. The controller 10 also executes a process according to the system ON/OFF signal as described below.

Figure 3:
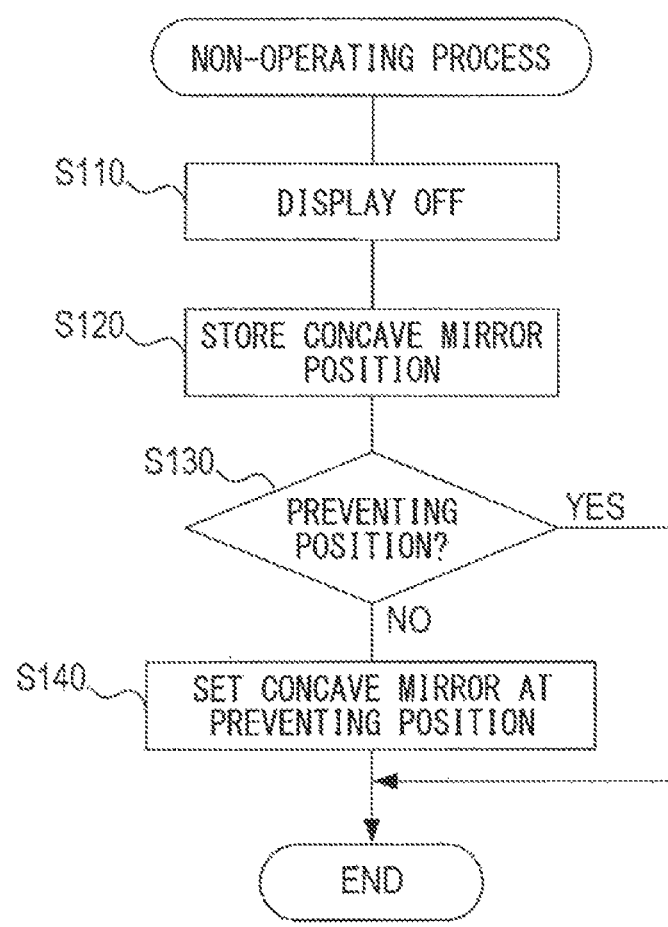
FIG. 3 is a flowchart of a non-operating process executed by CPU of a controller.

The controller 10 executes a non-operating process as illustrated in FIG. 3. The non-operating process is a process to prevent the strong light such as sunlight from entering the display 17 when the head-up display device 1 is off. For example, the non-operating process may start when the system OFF signal for turning off the head-up display device 1 is input into the controller 10.

In the process, as shown in FIG. 3, the display 17 is turned off not to emit an image (S110). The position (the angle) of the concave mirror 15 is stored in the memory 12 (S120). In other words, the value associated with the reflection direction of the display light by the concave mirror 15 is stored in the memory 12. It should be noted that the position of the concave mirror 15 is measured (controlled) by, for example, an encoder or the number of steps by a stepping motor, and the position as measured is stored in the memory 12.

Next, the controller 10 determines whether the position of the concave mirror 15 is the sunlight preventing position (S130). If true (S130: YES), the process proceeds to S210 as described below. If false (S130: NO), the concave mirror 15 is changed to the sunlight preventing position (S140). That is, the driver 33 is controlled to change the position of the concave mirror 15 to the sunlight preventing position.

Thereafter, the non-operating process is finished.

Figure 4:
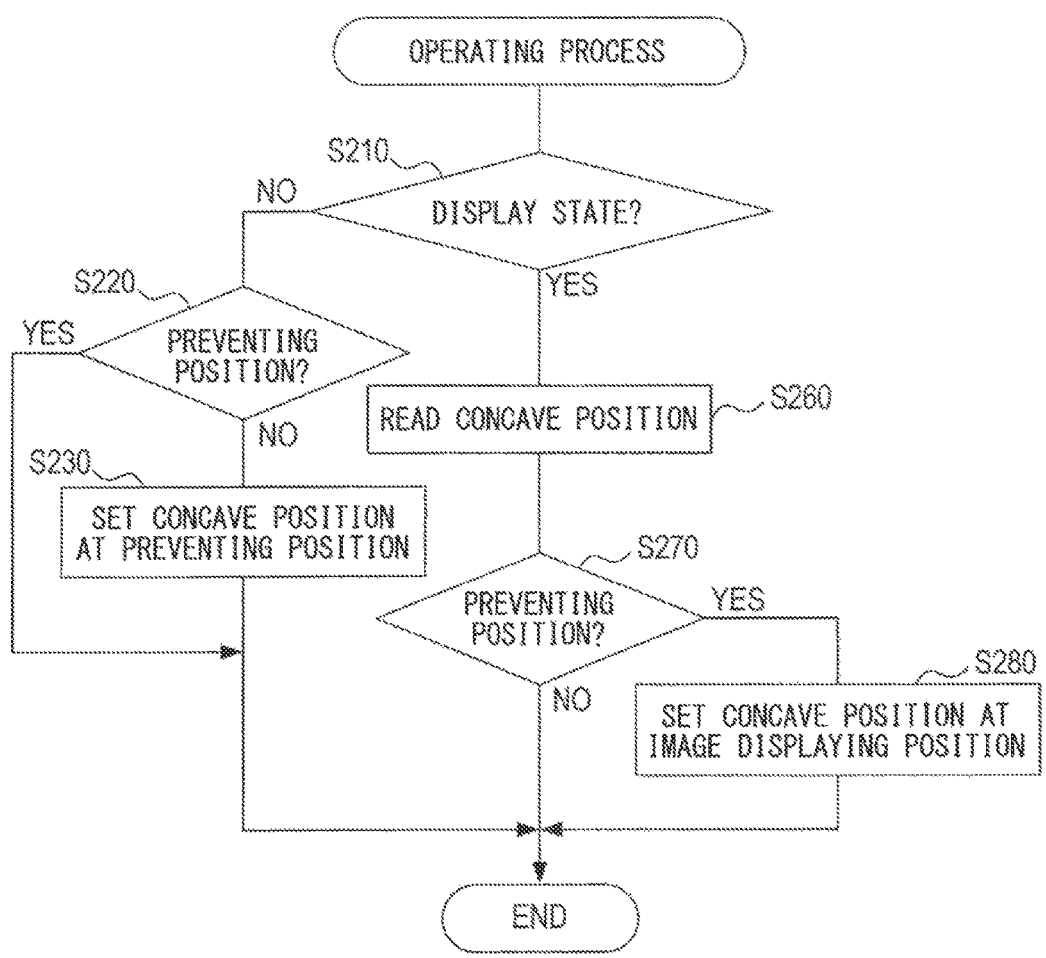
FIG. 4 is a flowchart of an operating process executed by the CPU of the controller.

Next, an operating process will be described with reference to FIG. 4. The operating process is a process for changing the position of the concave mirror 15 to a proper position when the head-up display device 1 is turned on or operating.

Furthermore, the operating process may start when the system ON signal for turning on the head-up display device 1 is input into the controller 10, and the process will be repeatedly executed thereafter.

In the operating process, the controller 10 determines whether the display 17 is in a display state (S210). The display state of the display 17 may include a state in which there is no possibility of the occurrence of malfunction in the display 17 due to outside light. In other words, the display state includes a state in which the outside light determining portion 13 determines that sunlight does not enter (reach) the display 17.

If the display is not in the display state (S210: NO), the controller 10 determines whether the position of the concave mirror 15 is the sunlight preventing position (S220). When the position of the concave mirror 15 is the sunlight preventing position (S220: YES), the operating process is finished without changing the position of the concave mirror 15.

When the position of the concave mirror 15 is not the sunlight preventing position (S220: NO), the position of the concave mirror 15 is changed to the sunlight preventing position (S230), and then the operating process is finished. When the display is in the display state (S210: YES), the position (the angle) of the concave mirror 15 is retrieved from the memory 12 (S260).

Then, the controller 10 determines whether the position of the concave mirror 15 is the sunlight preventing position (S270). When the position of the concave mirror 15 is the sunlight preventing position (S270: YES), the position of the concave mirror 15 is changed to the image displaying position (i.e., the position retrieved from the memory 12) at S280, and the operating process is finished. In other words, the reflection direction of the display light by the concave mirror 15 is set based on the value (the position) stored in the memory 12.

It should be noted that the position of the concave mirror 15 may be changed to a predetermined default position (e.g., the center of a range set as the image displaying position) for the concave mirror 15 if there is difficulty in using the position of the concave mirror 15 stored in the memory 12. For example, the default position of the concave mirror 15 may be used if the position of the concave mirror 15 cannot be retrieved from the memory 12.

When the position of the concave mirror 15 is not the sunlight preventing position at S270 (S270: NO), the operating process is finished.

(Effects of the Present Embodiment)

In the head-up display device 1 according to the above-described embodiment, the display 17 emits the display light and the concave mirror 15 reflects the display light emitted from the display 17 to project the display light onto the windshield 21. The driver 33 changes between the entering state in which outside light is able to enter the display 17 and the preventing state in which outside light is prevented from entering the display 17. The controller 10 controls the driver 33 to be (i) in the entering state when the display light is projected onto the windshield 21 and (ii) in the preventing state when the display light is not projected onto the windshield 21.

According to the head-up display device 1, the driver 33 is changed to the preventing state when the display light is not projected onto the windshield 21, whereby the display 17 can be protected from the outside light.

Furthermore, the controller 10 changes the driver 33 to the preventing state when the head-up display device 1 is turned off and to the entering state when the head-up display device 1 is turned on.

Hence, since the driver 33 is changed to the preventing state when the head-up display device 1 is off, the display 17 can be protected from the outside light.

Furthermore, the driver 33 is configured to change between the entering state and the preventing state by changing the reflection direction of the display light by the concave mirror 15, i.e., by changing the position (the angle) of the concave mirror 15.

Therefore, the entering state and the preventing state of the driver 33 can be changed by a simple mechanism.

Furthermore, the controller 10 stores the value (the position) associated with the reflection direction of the display light by the concave mirror 15 during the entering state of the driver 33 into the memory 12 when the controller 10 controls the driver 33 to change from the entering state to the preventing state. The controller 10 sets the reflection direction of the concave mirror 15 to the value stored in the memory 12 when the controller 10 controls the driver 33 to change from the preventing state to the entering state.

Accordingly, since the reflection direction of the display light by the concave mirror 15 during the entering state of the driver 33 is stored in the memory 12, the driver 33 can be returned to the prior state (i.e., the entering state) from the preventing state.

Furthermore, the controller 10 determines whether the outside light enters the display 17 when the driver 33 is in the entering state and controls the driver 33 to change to the preventing state when the controller 10 determines that the outside light enters the display 17.

Therefore, when it is determined that the outside light may damage the display 17, the driver 33 can be changed to the preventing state even during operation of the head-up display device 1. Thus, damage to the display 17 by the outside light can be suppressed.

In the present embodiment, the concave mirror 15 may provide a "reflecting member" and the memory 12 may provide a "memory portion". The driver 33 in the present embodiment may provide an "outside light preventing portion" and the windshield 21 may provide a "projection member".

Furthermore, the controller 10 executing the process of S120 may provide a "storing portion" and the controller 10 executing the processes of S130, S140, S260, S270 and S280 may provide a "state controller". The controller 10 executing the process of S210 may provide an "entrance determining portion" and the controller 10 executing the process of S230 may provide an "outside light prevention controller".

(Other Embodiments)

In the present embodiment, the driver 33, as the outside light prevention portion, changes the reflection direction of the concave mirror 15. However, a shutter or a blind (wind shade), which is configured to close and open the windshield 21, may be used as the outside light prevention portion to control the entrance of outside light into the display 17.

What is claimed is:

1. A head-up display device for projecting display light onto a projection member, the head-up display device comprising:
   a display that emits the display light;
   a reflecting member that reflects the display light emitted from the display in a reflection direction to project the display light onto the projection member;
   an outside light prevention portion that changes between
      an entering state in which undesirable outside light is able to enter the display, and
      a preventing state in which the undesirable outside light is prevented from entering the display; and
   a state controller that controls the outside light prevention portion to be (i) in the entering state when the display light is projected onto the projection member and (ii) in the preventing state when the display light is not projected onto the projection member.

2. The head-up display device according to claim 1, wherein
   the state controller further controls the outside light prevention portion to be (i) in the preventing state when the head-up display device is turned off and (ii) in the entering state when the head-up display device is turned on.

3. The head-up display device according to claim 1, wherein
   the outside light prevention portion changes between the entering state and the preventing state by changing the reflection direction of the display light by the reflection member.

4. The head-up display device according to claim 3, further comprising
   a storing portion that stores a value associated with the reflection direction of the display light by the reflection portion during the entering state of the outside light prevention portion into a memory portion when the state controller controls the outside light prevention portion to change from the entering state to the preventing state, wherein
   the state controller sets the reflection direction of the display light by the reflection portion based on the value stored in the memory portion when the state controller controls the outside light prevention portion to change from the preventing state to the entering state.

5. The head-up display device according to claim 1, further comprising
an entrance determining portion that determines whether the undesirable outside light enters the display when the outside light prevention portion is in the entering state, and
an outside light prevention controller that controls the outside light prevention portion to be in the preventing state when the entrance determining portion determines that the undesirable outside light enters the display.

6. The head-up display device according to claim 1, wherein
the undesirable outside light is sunlight.

7. The head-up display device according to claim 1, wherein
the outside light prevention portion changing between the entering state and the preventing state includes switching between the entering state and the preventing state.

* * * * *